United States Patent [19]

Cheng

[11] 4,370,309

[45] Jan. 25, 1983

[54] METHOD FOR REMOVING CARBON BLACK DEPOSITS

[75] Inventor: Paul J. Cheng, Bartlesville, Okla.

[73] Assignee: Phillips Petroleum Company, Bartlesville, Okla.

[21] Appl. No.: 207,587

[22] Filed: Nov. 18, 1980

[51] Int. Cl.³ .............................................. C01B 31/02
[52] U.S. Cl. .................................... 423/461; 423/449; 165/95
[58] Field of Search ....................... 423/449, 450, 461; 165/95

[56] References Cited

U.S. PATENT DOCUMENTS

| | | | |
|---|---|---|---|
| 1,916,337 | 7/1933 | Schmidt | 165/1 |
| 3,050,378 | 4/1962 | Krom | 23/314 |
| 3,369,870 | 2/1968 | Ganz et al. | 423/450 |
| 4,247,530 | 1/1981 | Cheng et al. | 423/449 |
| 4,296,800 | 10/1981 | Johnson | 423/450 X |

*Primary Examiner*—O. R. Vertiz
*Assistant Examiner*—Gregory A. Heller

[57] ABSTRACT

Combustion gases containing free oxygen and a carbonaceous feed are introduced into a carbon black reactor, with the combustion gases being at a temperature sufficient to pyrolyze the feed hydrocarbon to produce combustion products containing particulate carbon black. The combustion products are cooled by quenching to form a gaseous effluent containing particulate carbon black. The effluent is discharged from the reactor to an indirect heat exchange means for further cooling the effluent. Carbon black pellets are introduced into the effluent inlet of the indirect heat exchange means for removing carbon black which has become deposited on surfaces defining the flow path or flow paths for the effluent flowing through the heat exchange means. The effluent after cooling in the indirect heat exchange means is passed to separating means for separating the effluent into a gaseous portion and a particulate carbon black portion. Thereafter, the particulate carbon black portion can be pelleted.

23 Claims, 10 Drawing Figures

METHOD FOR REMOVING CARBON BLACK DEPOSITS

FIELD OF THE INVENTION

The present invention relates to method and apparatus for producing carbon black by pyrolysis of a carbonaceous feed. In another aspect, the invention relates to method and apparatus for removing carbon black deposits from indirect heat exchange means associated with the production of carbon black.

DESCRIPTION OF THE PRIOR ART

In a typical furnace black process, a carbonaceous feed is introduced into a reactor and contacted with preheated air or hot combustion gases which elevate the temperature of the feed to a temperature sufficiently high to decompose the feed to form combustion products containing particulate carbon black. Such combustion products are typically at a temperature in the range of about 2400° F. to about 2900° F. The combustion products are cooled, usually by introducing a quench fluid into the combustion products to form an effluent, sometimes referred to as "smoke", containing particulate carbon black. The effluent is subsequently separated into a gas phase and a particulate carbon black phase by separating means such as a cyclone separator, bag filters, or the like. However, before such filtering or separating step, the effluent must be cooled to a temperature sufficiently low to prevent damage to the separating means.

It is common practice to initially cool or quench the carbon black reactor effluent by injecting directly thereinto quench fluid at one or more points in a quench chamber portion of a reactor. Typical quench fluids include water, cooled effluent or smoke, and/or off-gas, i.e., a portion of the gas phase separated from the effluent. Such a first cooling step normally lowers the temperature of the combustion products to a temperature of about 2000° F. or less, preferably between about 1500° F. and 2000° F. The first cooling is effected to lower the temperature of the carbon black reactor effluent to a temperature which can be safely accommodated in a subsequent indirect heat exchange means and to a temperature below which no further production of carbon black occurs.

A second step of cooling involves the use, for example, of a first indirect heat exchange means such as a shell-tube heat exchanger which further lowers the temperature of the effluent to a temperature of about 1200° F. or less, preferably between 800° F. and 1200° F. The thus cooled effluent can then be passed to one or more economizers, for example, indirect heat exchangers which are operable for heating air and/or feed to be introduced into the reactor. It is also common practice in the art to finally cool the effluent by injecting a trim quench fluid, for example, water, off-gas, and the like into the effluent before passing the effluent to the separating means. The final cooling lowers the temperature of the effluent to a temperature which can be safely accommmodated by the separating means. Typically, this temperature would be below about 600° F. for separating means such as bag filters. However, this temperature is dependent upon the type of bag filters used or, in general, the type of separating means used.

However, one problem encountered with the use of such apparatus is that carbon black deposits tend to build up in the heat exchangers, especially in the first indirect heat exchanger. Since carbon black is a good insulator, a thin layer of the carbon black will substantially lower the heat transfer rate in the indirect heat exchanger. It is therefore necessary to clean the indirect heat exchanger from time to time in order to maintain a high heat transfer rate and adequate operating efficiency. One method of accomplishing the cleaning is shutting down the reactor and allowing the indirect heat exchanger to cool to a temperature at which the indirect heat exchanger can be partially disassembled for cleaning by methods well known in the art to remove carbon black deposits. However, such a method is wasteful in several respects in that the total apparatus must be shut down to effect cleaning and after cleaning a stabilization period of several hours is required before production of carbon black is recommenced. Another method of cleaning comprises intervallically introducing additional carbon black, in various forms, into the effluent inlet to the indirect heat exchanger for a short period of time in a quantity sufficient to remove the deposited carbon black. A particularly advantageous method of cleaning the indirect heat exchangers when a carbon black pelleter is connected downstream of the heat exchanger is to return a portion of the wet pellets and/or dried pellets, preferably such pellets which are off-size specification, as additional cleaning carbon black to the inlet portion of the tube side of the shell-tube heat exchanger. Other forms of carbon black can also be effectively used as the additional cleaning carbon black. The cleaning carbon black can be, for example, flocculent carbon black, wet flocculent carbon black, partially agglomerated carbon black, dry carbon black pellets, wet carbon black pellets, and the like.

Such injection of additional cleaning carbon black into a shell-tube type heat exchanger is an effective way of cleaning the tubes to restore heat transfer efficiency. In such a heat exchanger, carbon black reactor effluent which has been quenched with quench fluid, preferably by adding directly to the effluent cooled recycled smoke, to a temperature of about 2000° F., and preferably between 1500° F. and 2000° F. is charged to the tube side of a shell-tube boiler, wherein on the shell side, high pressure hot water, for example, 600 psia, 485° F., is converted to steam, for example 600 psia, 485° F., and the carbon black containing gaseous effluent exits the tubes at about 1200° F. or preferably lower. When carbon black deposits accumulate on the inner peripheries of the tube walls of such a shell-tube heat exchanger, heat transfer efficiency is decreased and the temperature of the effluent from the tubes of the heat exchanger increases. By adding additional cleaning carbon black to the inlets of the tubes or plenum, continuously, cyclically, or intervallically as required by decrease of heat transfer efficiency as indicated by too high tube side gas outlet temperature, cleaning of the inner peripheries of the tube walls can be effected and heat transfer efficiency can be restored. There are, however, two problems. The first problem is that because of the rapid redeposition of the carbon black on the inner peripheries of the tube walls, the heat transfer rate and the steam generation rate vary in a broad range if the intervals between cleaning carbon black injection are of great duration. The second problem is that because of the number of tubes in a typical shell-tube heat exchanger as is used in the carbon black art, it is difficult to distribute additional cleaning carbon black uniformly to all tubes thereby to effect uniform removal of deposits from the inner peripheries thereof.

It is an object of the present invention to provide a method and an apparatus of producing carbon black which can be operated substantially continuously without need of completely terminating operation for cleaning of an indirect heat exchanger to maintain the heat exchange transfer rate in a desired range. It is a further object of this invention to provide a method and an apparatus whereby additional cleaning carbon black, in pellets or other suitable form, can be distributed to the tubes of a heat exchanger at different loci adjacent the upstream or inlet end of the heat exchanger so that additional cleaning carbon black is continuously, cyclically, or intervallically introduced into the tubes of a shell-tube or other appropriate heat exchanger to assure continuous, cyclic, or intervallic distribution of the carbon black among the various tubes for the cleaning of deposits accumulated in such tubes.

Other objects and advantages of the present invention will become apparent from the following description taken in connection with the accompanying drawings wherein are set forth by way of illustration and example certain embodiments of this invention.

SUMMARY OF THE INVENTION

Briefly, the invention comprises, in a method for producing carbon black wherein a gas stream containing carbon black is passed through means defining a flow path of an indirect heat exchanger laying down carbon black deposits thereon, means and method for removing at least a portion of the carbon black deposits comprising selectively introducing additional cleaning carbon black in an amount effective to remove at least a portion of the carbon black deposits into at least one portion of the means defining a flow path and flowing said additional cleaning carbon black along with said gas stream through the means defining a flow path to remove at least a portion of the carbon black deposits therefrom; and selectively introducing additional cleaning carbon black into at least one remaining portion of the means defining a flow path and flowing said additional cleaning carbon black along with said gas stream through the means defining a flow path to remove at least a portion of the carbon black deposits therefrom.

DESCRIPTION OF THE INVENTION

In a preferred embodiment the invention comprises, in a method for producing carbon black wherein carbon black deposits are laid down on an indirect heat exchanger, method for selectively distributing additional cleaning carbon black in pellets or other suitable form as herein described to a number of inlet loci of a shell tube heat exchanger for example, to a number of loci circumferentially spaced in the plenum, and thence to respective portions of the tubes of the shell-tube heat exchanger, selectively effecting removal of at least a portion of the carbon black deposits in the respective portion of the tubes, thereby restoring heat transfer to the desired level in that portion, e.g., 1200° F. or lower for the tube side heat exchanger effluent temperature. Preferably the method comprises selectively, intervallically, or cyclically distributing the additional cleaning carbon black to the different loci to effect cleaning, although simultaneous and/or continuous distribution of the additional cleaning carbon black to the different loci is also consistent with the inventive concept. The pellets added during the cleaning of the tubes break up and the fines produced are carried by the gas containing produced carbon black ultimately to the pelleting-drying operation from which, preferably, the cleaning carbon black pellets were derived. The apparatus comprises, in accordance with the present invention, means whereby the cleaning carbon black pellets are distributed to the heat exchanger at more than one location, for example, through a rotary valve or other means as hereinafter described, having at least one and more preferably more than one outlet, which is rotating according to a desired cycle time either continuously or intervallically, to supply pellets to different input loci of the heat exchanger simultaneously or at different times.

Figure 1:
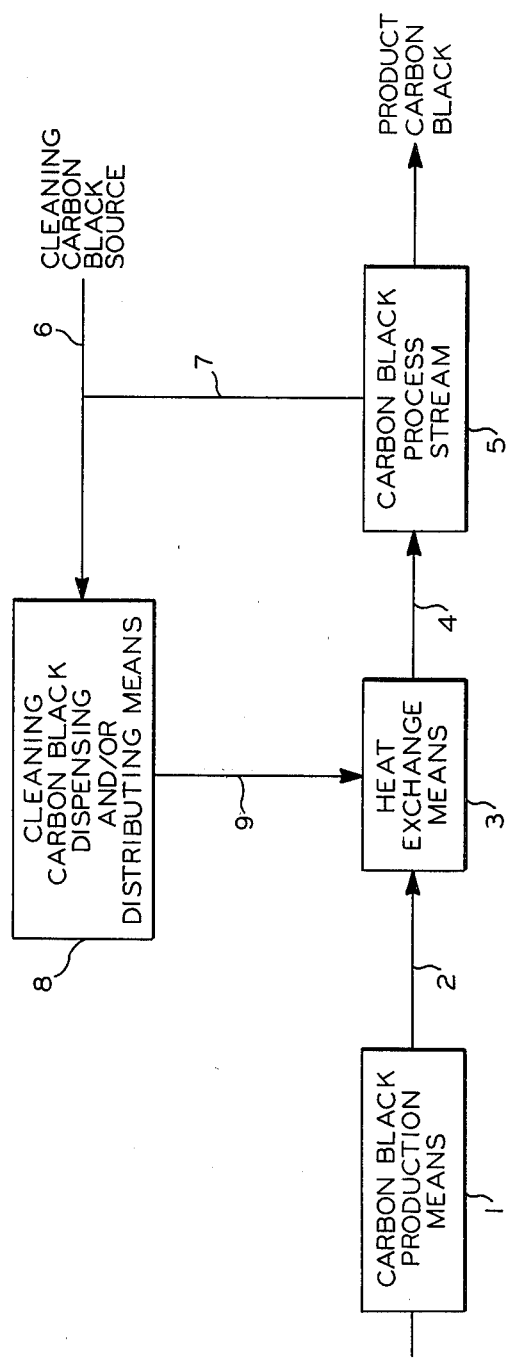
FIG. 1 is a block diagram illustrating the invention.

Referring now to the drawings in detail and specifically to FIG. 1, the reference numeral 1 designates generally a carbon black production means operable for producing a hot gaseous carbon black containing effluent stream 2 which is cooled in heat exchange means 3 to provide a cooled carbon black containing stream 4 which is further processed as a process stream 5 to produce a product carbon black stream. As shown, a portion of the carbon black is diverted from the process stream and used as a cleaning carbon black stream 7. Alternatively, the additional cleaning carbon black can be obtained via a stream 6 from another source. Cleaning carbon black dispensing and/or distributing means 8 are provided whereby a cleaning carbon black stream 9 is used to selectively clean at least selective portions of heat exchange means 3.

Figure 2:
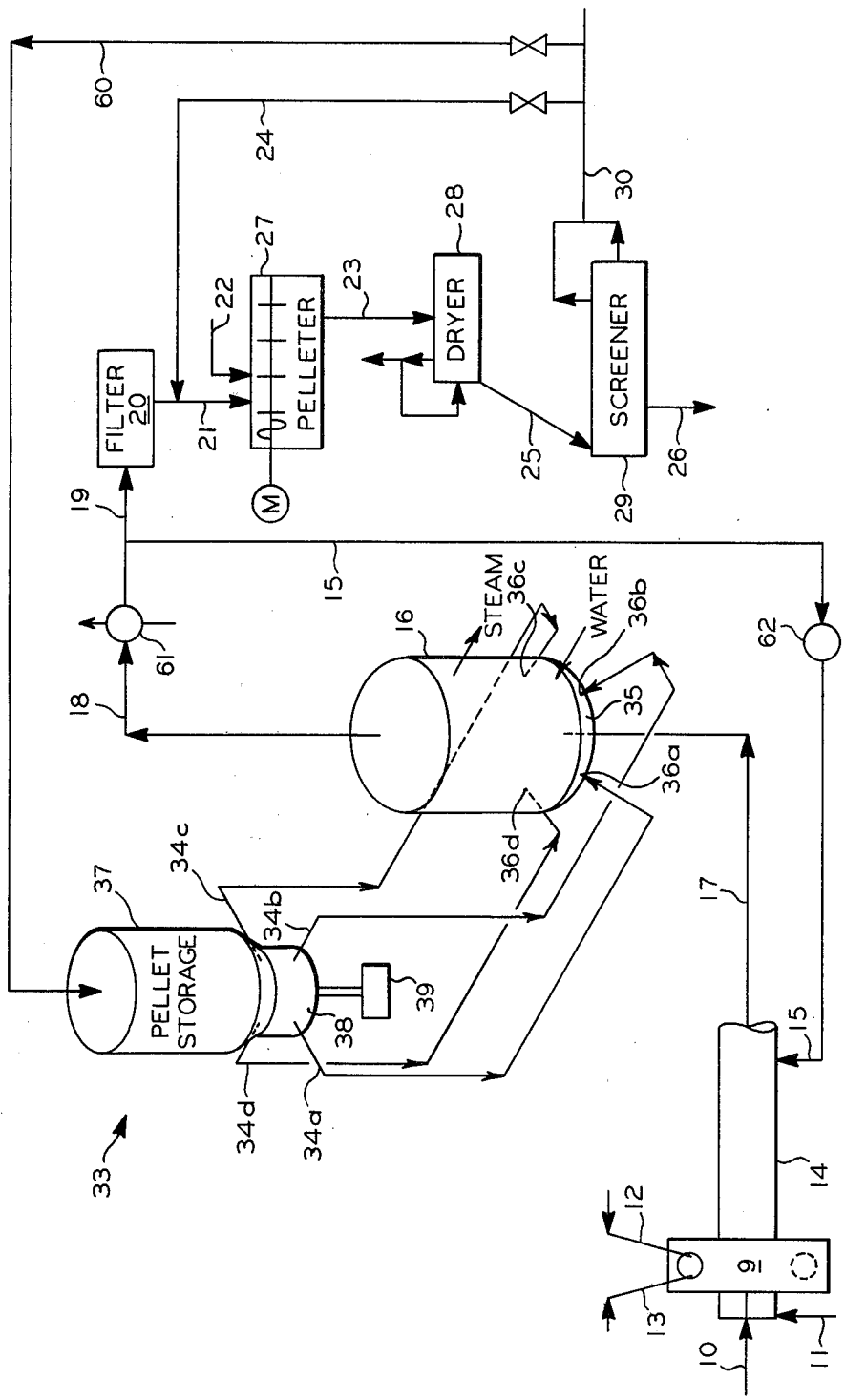
FIG. 2 is a schematic diagram of carbon black producing apparatus showing one embodiment of the invention.
Figure 6:
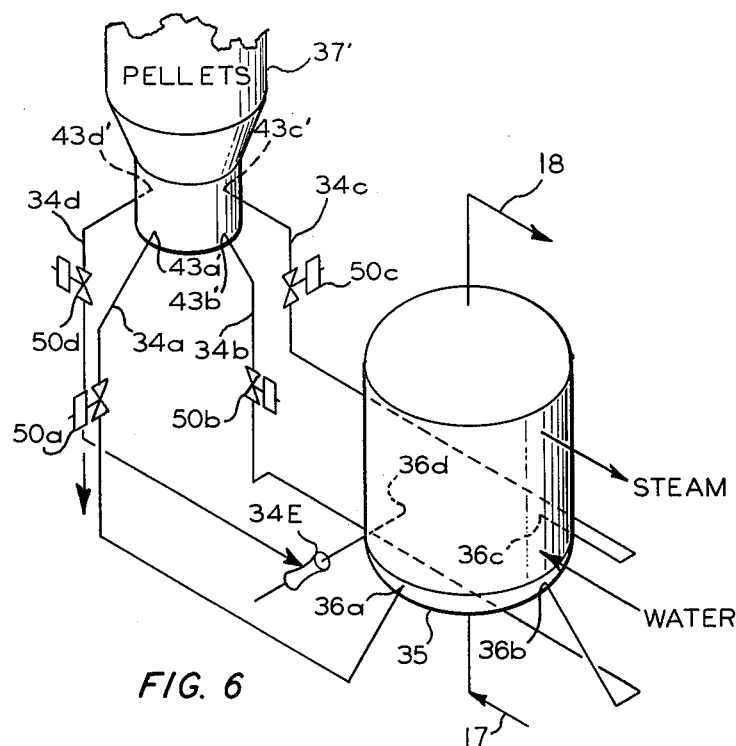
FIG. 6 is an embodiment showing a further modification of the embodiment of FIG. 5 by the addition of control means.

Referring now to FIG. 2, the reference numeral 14 designates generally a carbon black reactor of any suitable type. Air is introduced into the reactor 14 via an inlet 3 and fuel is introduced into the reactor 14 via an inlet 12. A carbonaceous feed is introduced into the reactor via an inlet 10. Cooling air 11 is added around inlet 10. Air and fuel introduced via the inlets 13 and 12, respectively, can be combusted before introduction into the reactor or combusted within a combustion chamber 9 of the reactor 14. The combustion gases contact the feed from the inlet 10 and pyrolyze the feed to produce combustion products including particulate carbon black. The reactor 14 has an outlet thereof connected in flow communication via conduit means 17 with an indirect heat exchanger 16 such as a shell-tube heat exchanger. A heat exchange fluid such as water is introduced into, for example, the shell side of the heat exchanger 16 via an inlet and is generally discharged as stream as shown in FIGS. 2 and 6. The inlet to the tube side of the heat exchanger 16 receives effluent from the reactor 14 via conduit means 17 with the effluent flowing through the heat exchanger for discharge from an outlet thereof to conduit means 18. The conduit means 18 as illustrated includes one or more heat exchangers 61 connected in flow communication in the conduit means 18 for receiving effluent which can be used as the heat exchanger medium for heating such fluids as air, carbonaceous feed, and/or water, for example, air to be charged at inlet 13, for use in the carbon black producing process as in known in the art. A portion of heat exchanger outlet can be returned to the reactor 14 as a quench fluid, for example, via conduit 15 and blower 62.

Cleaning carbon black dispensing means 33 is connected in flow communication with cleaning carbon black distribution means comprising, for example, one or more conduit means 34a, 34b, 34c, and 34d, in flow communication with one or more loci, for example, inlets 36a, 36b, 36c, 36d, to the plenum 35 of the upstream or inlet end of heat exchanger 16 whereby cleaning carbon black may be selectively, if desired, introduced into the different inlets of the said heat exchanger continuously, intervallically, or cyclically to remove accumulated carbon black deposits from the walls thereof. Although my invention is illustrated by a preferred embodiment in which carbon black is introduced into plenum 35 via four conduits and inlets, it is apparent that the number of conduits and/or inlets can be varied in accordance with the principle of this invention so long as the cleaning carbon black is selectively distributed to at least two different portions of the heat exchanger means 16. As shown in FIG. 2, the cleaning carbon black dispensing means 33 preferably comprises a bin 37, for storage of the cleaning carbon black, adapted with a rotary valve portion 38, having one or preferably more than one outlet 43a, 43b, 43c and 43d (see also FIG. 4) and capable of continuous, cyclic, or intervallic operation so as to continuously, cyclically or intervallically dispense cleaning carbon black into said cleaning carbon black distributing means, for example, into one or more of the conduit means 34a, b, c, and d (see also FIGS. 2 and 5) for distribution to said one or more loci, for example, inlets 36a, b, c, d of plenum 35 of the heat exchanger 16 whereby the cleaning carbon black is introduced into different portions of the heat exchanger each portion comprising one or more of, for example, the tubes of an indirect heat exchanger to facilitate selective distribution of the cleaning carbon black among the various portions and hence among the various tubes of the heat exchanger to promote more uniform cleaning.

Figure 3:
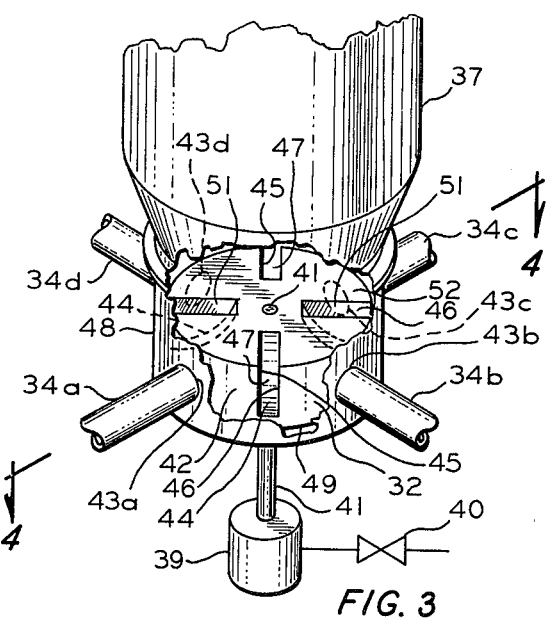
FIGS. 3 and 4 show an embodiment of a carbon black dispensing means suitable for use in the invention.
Figure 4:
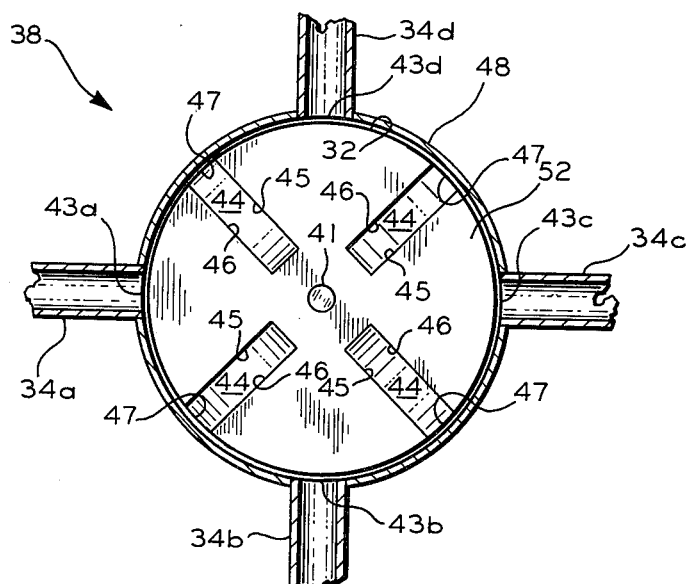

Cleaning carbon black dispensing means 33 further comprises an outlet portion, seen in FIG. 3 and FIG. 4, comprising generally cylindrical external housing 48, having at least two and preferably four or more through openings 43a, b, c, d therethrough in flow communication with conduit means 34a, b, c, d respectively which are in turn in flow communication with through openings functioning as inlets 36a, b, c, d of the plenum 35 of heat exchanger 16 (see also FIG. 2) as described above.

The cleaning carbon black dispensing means 33 further comprises (see also FIG. 3) a rotary valve comprising in a preferred embodiment a drive motor 39 controlled by control means 40, drive shaft 41, and a rotary valve member 42 rotatably mounted within housing 48. Control means 40 may be any suitable control means known in the art whereby motor 39 is controlled by a control signal, for example, a signal at timed intervals from a time control means or a signal responsive to sensed temperature conditions from temperature control means. Member 42 preferably comprises support means, for example, one or more disks 49 and 52, said disk 52 having spaced apart openings 51 therein, rotatably mounted on shaft 41, and at least one and preferably four or more carbon black delivery means, preferably comprising a generally cylindrical internal housing 32 having opposite ends attached circumferentially to disks 49 and 52 and having at least one and preferably 4 or more circumferentially spaced through openings 47 serving as carbon black gates. Upper disk 52 has a through opening 51, for example, a generally rectangular opening, adjacent each gate 47. Openings 51 and 47 are in flow communication whereby carbon black received from bin 37 through opening 51 is delivered to gate 47 and is further preferably adapted with guide means, for example side walls 45 and 46 and chute 44 whereby carbon black from bin 37 is channeled from opening 51 to gate 47. The internal housing 32 is in narrow clearance adjacent spaced apart rotatable relationship to external housing 48 whereby at least one and preferably four or more gates 47 are aligned in feed through relationship to openings 43a, b, c, d during rotation of the rotary valve whereby cleaning carbon black is dispensed from bin 37 into respective conduits 34a, b, c, d. In a preferred embodiment the valve can be rotated through a cleaning cycle with at least a portion of each carbon black dispensing gate 47 adjacent each outlet 43a, 43b, 43c, 43d of the external housing 48 for one or more predetermined durations, known as distribution periods, in which positions cleaning carbon black is dispensed into the outlet for distribution to a corresponding inlet 36a, 36b, 36c, 36d of the heat exchanger plenum 35, and otherwise being in a neutral or blind position for an elapsed time period during which the gate 47 is not adjacent an outlet 43 and cleaning carbon black is not dispensed into the conduits 34a, b, c, d for transfer to the heat exchanger 16. The period of time comprising the distribution periods and elapsed time periods of a single 360° rotation of the rotary valve constitutes a single cleaning cycle. For example, a single 360° rotation of the rotary valve may occur in 150 seconds with each gate 47 remaining at each outlet for a distribution period of 2.5 seconds and during the remaining duration of the rotation cycle, constituting the sum of the elapsed time periods, being in neutral or blind position.

By introducing the cleaning carbon black selectively into different portions of the heat exchanger 16 for example, at a plurality of loci, represented in a preferred embodiment by distribution loci, such as inlets 36a, b, c, d to the plenum 35 of the heat exchanger 16, selective distribution of the cleaning carbon black throughout the cross-sectional area of a selected portion of the tubes is achieved for effectively uniform cleaning of the carbon black deposits from the inner peripheries of all the tubes in each such portion of the heat exchanger. Distribution of carbon black for a distribution period to each of said portions occur at least once and preferably 4 or more times during each cleaning cycle.

Figure 5:
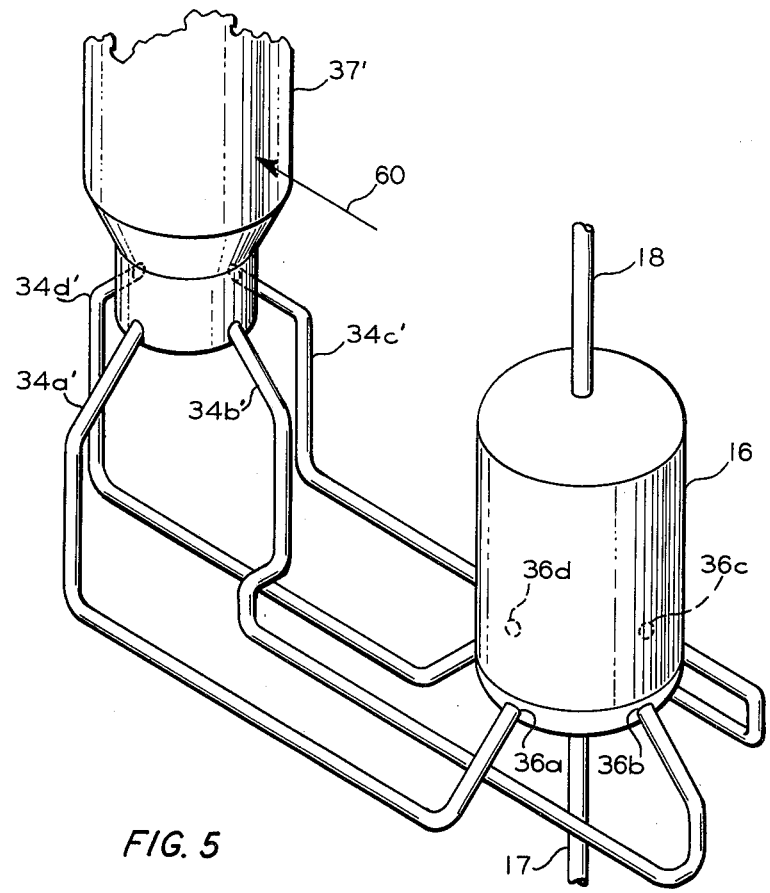
FIG. 5 shows an embodiment of the invention connecting a carbon black dispensing means to heat exchange means.

Another embodiment of the invention is illustrated in FIG. 5 wherein bin 37' is connected in flow communication with two or more, preferably four or more conduits, for example, conduits 34a', b', c', d' which are in flow communication with inlets 36a, b, c, d respectively of heat exchanger means 16 whereby cleaning carbon black is continuously introduced into said heat exchanger adjacent respective portions of the tubes thereof to effect cleaning thereof.

Figure 7:
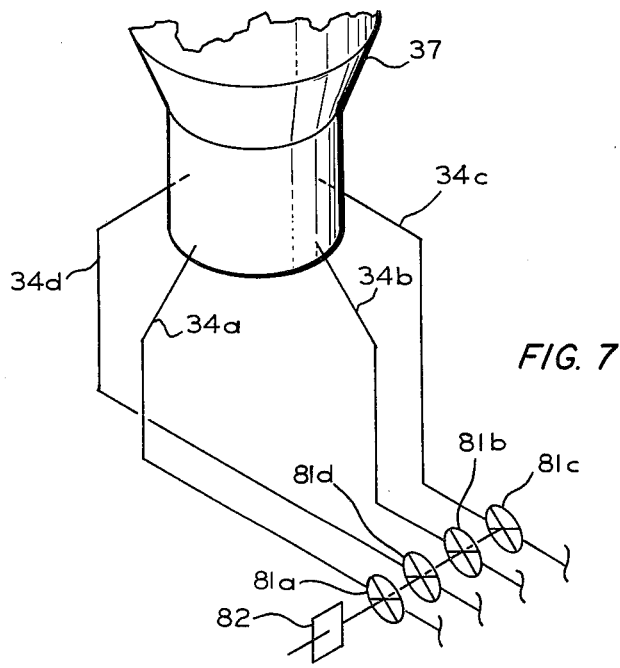
FIG. 7 shows an alternative embodiment of the control means.

Another embodiment of the present invention is illustrated in FIG. 6. In FIG. 6 time controlled valves, for example, solenoid actuated valves 50a, b, c, d, are connected in series with each conduit means 34a, b, c, d, in flow communication with the outlets 43a', b', c', d' of the cleaning carbon black storage means 37'. Each of the conduit means 34a, b, c, d can have eductor means illustrated, for example, as 34E in line 34d to provide a carrier fluid to carry the cleaning carbon black into plenum 35. Preferably, the carrier fluid has a pressure in the range 5 to 10 psia. The cleaning carbon black may be gravity fed or in a preferred embodiment the storage means 37' may be pressurized, for example, at 5 psig or less. Valves 50a, b, c, d, can be controlled as is known in the art so as to effect continuous or time selective introduction of cleaning carbon black selectively into inlets 36a, b, c, d of heat exchange means 16 thereby to effect continuous, cyclic, or intervallic cleaning of respective portions therof. Alternatively to the solenoid valve control means shown in FIG. 6 any control means adapted to control the introduction of cleaning carbon black sequentially and/or with respect to duration into the plenum 35 of the heat exchanger 16 at different loci 36a, b, c, d may be employed in accordance with the present invention. For example, star valves 81a, b, c, d can be used as shown in FIG. 7 and can be controlled by control means 82 to effect selective distribution as desired of cleaning carbon black to heat exchange means 16.

Figure 8:
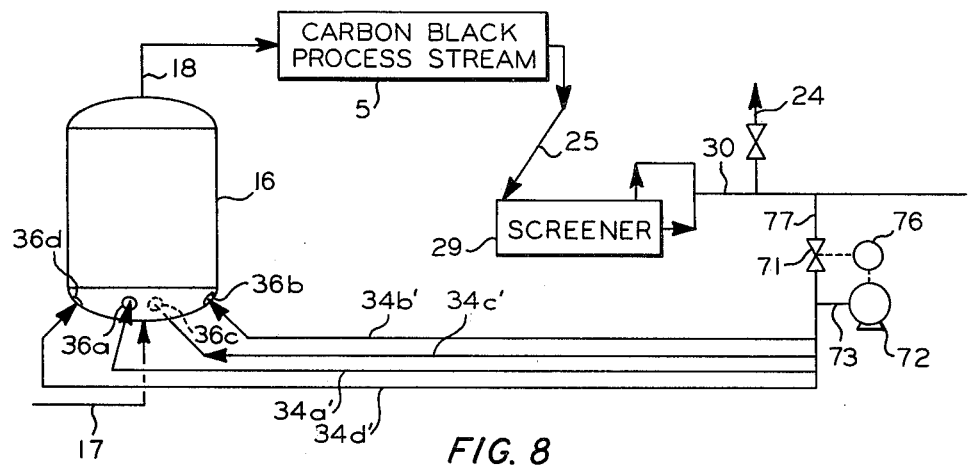
FIG. 8 is an embodiment of the invention in which carbon black distributing means has an input connected to a screener output stream of a carbon black process stream.

Another embodiment of the invention is shown in FIG. 8 wherein cleaning carbon black, for example, off-size specification carbon black pellets from screener 29 in process stream 5 are controlled via valve 71 in conduit 77 for distribution to conduits 34a', b', c', d' to inlets 36a, b, c, d of heat exchange means 16. A carrier fluid, for example, off-gas, or nitrogen, is supplied via a conduit 73 and blower 72. Valve 71 can be operated manually or by control means 76 to effect admission of cleaning carbon black into conduits 34 and operation of blower 72 simultaneously.

Figure 9:
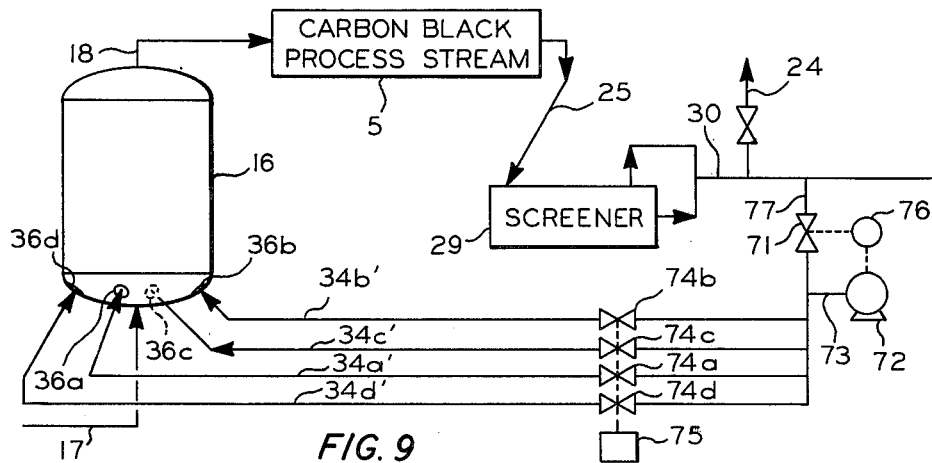
FIG. 9 is an embodiment as in FIG. 8 but employing alternative control means.

Another embodiment is illustrated in FIG. 9 wherein the embodiment of FIG. 8 is equipped with valves, preferably ganged valves 74a, b, c, d in conduits 34a', b', c', d' respectively, connected to control means 75 whereby valves 74a, b, c, d are controlled as is known in the art to effect continuous, sequential, and/or time selective introduction of cleaning carbon black, for example, off-size specification pellets from screener 29 to heat exchanger inlet means 36a, b, c, d. Valves 74a, b, c, d can be further controlled as is known in the art to effect cyclic, continuous, or intervallic introduction of cleaning carbon black into the various inlet loci 36a, b, c, d of heat exchanger means 16 to effect cleaning of respective portions thereof.

As further illustrated in FIG. 2, separating means 20 such as a bag filter is connected in flow communication with the conduit means 18 and 19 for receiving effluent therefrom. The separating means 20 is operable for separating the effluent into an off-gas phase portion for discharge via an outlet (not shown) and a flocculent carbon black phase portion which is discharged via an outlet conduit means 21. The outlet conduit means 21 connects the separating means 20 in flow communication with a pelleter 27 as is known in the art. Generally a pelleting fluid, e.g., water with or without added pelleting aids sch as calcium lignosulfonate and the like, is added via conduit 22. The pelleter 27 is operable for forming the flocculent carbon black from the separator means into wet pellets. A discharge conduit 23 connects the pelleter 27 in flow communication with a dryer 28 for subsequent drying as is known in the art. Dried pellets are discharged from the dryer 28 via a discharge conduit means 25. The discharge conduit means 25 connects the dryer 28 in flow communication with a screener 29 which is operable for receiving the pellets from the dryer and separating the pellets according to their size. Pellets of the desired size are discharged via a discharge conduit means 26 for further processing as is known in the art. Off-size pellets are discharged via a second discharge conduit means 30. The off-size pellet discharge conduit means is connected to recycle conduit means 24 and/or to conduit means 60. Recycle conduit means 24 is in flow communication with conduit means 21 which is in flow communication with the pelleter 27. Conduit means 24 is operable to recycle off-size specification carbon black pellets from the screener 29 to the pelleter, usually by way of a pulverizer (not shown) and thence to subsequent processes as described above. Conduit means 60 provides flow communication between off-size specification conduit means 30 from the screener 29 and the cleaning carbon black storage means 33 and is operable to deliver the off-size specification carbon black pellets from the screener 29 to the storage means 33. In the embodiment illustrated in FIGS. 8 and 9, off-size specification carbon black is connected via conduit 77 and valve means 71 to inlets 36a, b, c, d of the heat exchange means 16.

As shown in the preferred embodiments, off-size specification carbon black pellets are used as the cleaning carbon black, however the principle of the present invention is not limited thereto. Thus, any of the forms of carbon black which can be introduced in sufficient amount to effect cleaning of the heat exchanger means, e.g., flocculent carbon black, wet pelleted carbon black, dry pelleted carbon black, off-size specification dry pelleted carbon black, or any mixture of these or other forms of carbon black may be used as cleaning black in accordance with the present invention. In the event that it is desired to use flocculent carbon black for cleaning black, for example, conduit means (not shown) may be connected in flow communication between separator means 20, outlet conduit 21 and storage means 33. Further, as an optional mode of operation, water can be introduced into the flocculent carbon black in the conduit means, for example, in an outlet conduit means in a suitable mixer (not shown) in the event it is desired to use wet flocculent carbon black as the cleaning black.

Figure 10:
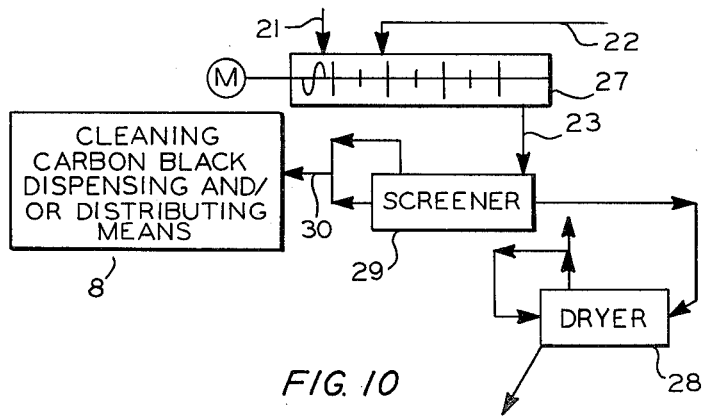
FIG. 10 is an alternative embodiment of a portion of the carbon black process stream.

As an example, FIG. 10 illustrates an arrangement of pelleting, screening, and drying wherefrom off-specification wet pellets are removed via conduits 30 and used to clean exchanger 16. Such wet pellets can have from about 40 to about 60 weight percent water.

To effect conveying of the cleaning carbon black to the storage means 33 or to effect conveying of the carbon black from the storage means 33 to the heat exchanger 16, a fluid carrier can be used in an effective manner. Any suitable source of fluid carrier can be provided as is known in the art, for example, cooled smoke from 15, off-gas from 20, nitrogen, and the like. Alternatively, the cleaning carbon black can be conveyed from the storage means 33 to the heat exchanger 16 by gravity feed or by pressurizing the storage means or by any other suitable method.

The cleaning carbon black is continuously, intervallically, or cyclically introduced into the heat exchanger 16 either periodically or at random intervals as determined by the particular carbon black producing process and either simultaneously to all of the inlets 36a, b, c, d or selectively to each as desired. In a preferred embodiment, the cleaning carbon black is selectively distributed to each of the inlets in turn. The rotary valve 38 or its equivalent may be controlled by suitable control means which would effect operation of the rotary valve 38 to dispense cleaning carbon black into conduit means 34a, b, c, d for introduction into the heat exchanger 16 in the event the effluent exiting the tubes of the heat exchanger 16 is at too high a temperature indicating a relatively low heat transfer rate. The valve 38 can also be connected to timer means (not shown) which would actuate or inactivate the valve 38 at regularly spaced intervals or random intervals or continuously to permit the introduction of cleaning carbon black into the heat exchanger 16 to effect the cleaning of carbon black deposits from the inside walls thereof. The valve 38 is maintained with gate 47 adjacent each outlet 43a, b, c, d for a sufficient time to permit a sufficient quantity of carbon black to be introduced into the heat exchanger at each of the plurality of inlet loci 36 to effect the cleaning. Preferably, the valve is rotated continuously in 150-second cycles with discharge gate 47 remaining adjacent each outlet 43a, b, c, d for 2.5 seconds and during the remaining time of the cycle being in the neutral or blind position.

The carbon black added is in an amount sufficient to remove at least a portion of the carbon black deposits from the heat exchanger. Also, it is preferred that the carbon black be added in a sufficiently short time distribution period or interval that the concentration of the total carbon black passing through the heat exchanger will be high enough to effect removal of at least a portion of the carbon black deposits. In operation, the cleaning carbon black is added in an amount to achieve an increase of concentration of carbon black by an amount in the range of between about 0.2 lbs/1000 SCF to about 35 lbs/1000 SCF of effluent flowing through the tubes of heat exchanger 16. The amount of carbon black introduced is an amount effective to clean at least a portion of the deposited black from the heat exchanger, i.e., at least above about 1 percent of the amount of black passing through per unit time. More preferably the additional amount of cleaning carbon black is added in an amount sufficient to increase the total amount of carbon black flowing through the selected portion of the heat exchanger to an amount at least above about 6 pounds per 1000 SCF, more preferably an amount in the range of about 6 pounds per 1000 SCF to about 35 pounds per 1000 SCF, and most preferably to an amount in the range of about 7.5 pounds per 1000 SCF to about 35 pounds per 1000 SCF. There is no true upper limit to the amount of additional cleaning carbon black which can be added except as limited by the amount which can be physically flowed through the heat exchanger consistently with good heat exchange capacity. For most any carbon black producing system in which carbon black deposits are laid down in the indirect heat exchanger, the preferred ranges are effective to reduce carbon black deposits and improve heat transfer efficiency, and particularly effective results are expected when the additional cleaning carbon black increases the total carbon black to an amount in the range of about 7.5 to about 35 pounds per 1000 SCF.

In a preferred embodiment of the present invention, additional cleaning carbon black is added to the different inlet loci 36, at least once during a unit period of time in an amount in the range of between about 1 percent and about 10 percent of the carbon black passing through the heat exchanger 16 during that period of time. Preferably, the amount of carbon black is in the range of about 2 percent to about 4 percent of the carbon black passing through per unit time. Preferably the unit time is a period of about 1 hour. Cleaning carbon black cycles occur at intervals effective to prevent excessive temperature fluctuation at the heat exchanger effluent outlet, at least 2 times per unit time. It is preferred that cleaning carbon interval or cycle occur in the range of between about 2 times to about 60 times per hour and more preferably in the range of about 4 to about 24 times per hour. The distribution period is a duration effective to remove at least a portion of the deposited black from the heat exchanger, for example, ¼-second or greater. Further, the distribution interval of each introduction of cleaning carbon black to each inlet locus of the heat exchanger is in the range of between about ¼-second to about 10 seconds and preferably in the range of about ½ to 3 seconds. However, cleaning carbon black may if desired be introduced continuously in accordance with the principle of this invention. It is preferred that the effluent flow through the effluent flow path at a speed of at least about 180 ft/sec and more preferably at least about 200 ft/sec. to effectively entrain the cleaning carbon black for cleaning respective portions of the heat exchanger.

As is known in the art of carbon black making, the temperature variation at the effluent outlet of the heat exchanger can vary from 1200° F. up to as much as 1600° F. However, such wide temperature fluctuation can cause temperature fatigue of the apparatus itself and undesirable downstream temperature variation. Clearly, the cleaning cycle could be controlled so as to occur only relatively infrequently when the heat exchanger effluent outlet temperature reached an upper limit, for example, 1600° F. However, when such long intervals elapse between cleaning cycles, more carbon black is deposited, and larger amounts of cleaning carbon black must be used concomitantly tending to require longer distribution times and higher rates of effluent fluid flow to entrain the cleaning carbon black. According to a preferred embodiment of the invention, cleaning carbon black cycles occur relatively frequently or the cleaning carbon black is introduced continuously. Under these conditions, introduction of a smaller quantity of cleaning carbon black is required during each distribution period, the distribution period can be brief, temperature fluctuation is minimized, and lower rates of effluent fluid flow can be utilized to entrain the cleaning carbon black. It is to be noted that for each introduction of carbon black during the unit time period, the amount of cleaning carbon black introduced can be equal amounts of cleaning carbon black for each period of introduction or can be unequal amounts. However, it is preferred that the amounts be generally equal.

In order to illustrate the present invention, the following calculated example is provided, calculated for a large scale vortex flow oil furnace reactor producing N220 black.

EXAMPLE

FLOW RATES AND CONDITIONS (CALCULATED-DURING CLEANING CYCLE)

The following numbers in parentheses refer to the drawings.

| | |
|---|---:|
| (10) Oil Feed, gal/hr | 400 |
| API @ 60° F. | 0.4 |
| BMCI | 125 |
| Mid Boiling Point, °F. | 600–1200 |
| (11) Oil Tube and Nozzle Cooling Air, SCF/hr | 6,000 |
| Temperature, °F. | 100 |
| (12) Tangential Fuel (Gas, 940 Btu/SCF): | |
| SCF/hr | 12,600 |
| Temperature, °F. | 60 |
| (13) Tangential Air, SCF/hr | 234,000 |
| Temperature, °F. | 1,000 |
| (14) Reactor Effluent Before Quench: | |
| SCF/hr | 332,000 |
| Temperature, °F. | 2,600 |
| Pressure, psig | 4 |
| Lbs carbon black/1000 SCF, (N220 type) | 5.4 |
| (15) Cooled Recycle Smoke Quench: | |
| SCF/hr | 135,000 |
| Temperature, °F. | 500 |
| Lbs carbon black/1000 SCF, (N220 type) | 5.55 |
| (60) Recycle Dry Pellets for Cleaning: | |
| Lb/hr | 50 |
| Temperature of Mass, °F. | 250 |
| Pellet Sieve Size, (U.S. Standard) mesh | <120 to >10 |
| (36) Cleaning Carbon Black to Heat Exchanger: | |
| via 36a, lbs/hr | 12.5 |
| time of flow, sec | 10 |
| lbs/10 sec | 0.52 |
| via 36b, lbs/hr | 12.5 |
| time of flow, sec | 10 |
| lbs/10 sec | 0.52 |
| via 36c, lbs/hr | 12.5 |
| time of flow, sec | 10 |
| lbs/10 sec | 0.52 |
| via 36d, lbs/hr | 12.5 |
| time of flow, sec | 10 |
| lbs/10 sec | 0.52 |

The cleaning carbon black pellets are assumed added with 4 tubes spaced at 90 degree loci around the plenum of the inlet tube end of a shell tube heat exchanger. The valve 38, FIGS. 2 and 3, is rotated to positions 43a, b, c, d continuously at 150 seconds per revolution, remaining at each position for 10 seconds. The remaining time is spent in neutral or blind position. This effects selective distribution of the pellets throughout the cross-sectional area of the tubes for effectively cleaning the carbon black deposits from the inner peripheries of all the tubes. Chamber pressure at pellet reservoir is 5 psig.

| (18) Effluent from Exchanger 16 Tubes: | |
|---|---:|
| SCF/hr | 467,000 |
| Lbs carbon black/1000 SCF | 5.97 |
| Temperature, °F. | 1,200 ± 15 |

Calculated temperature fluctuation at the heat exchanger is about 30° F. compared to about 100° to 120° F. where pellets are injected into the heat exchanger for cleaning without distribution at different loci.

| (19) Feed to Filter (20): | |
|---|---:|
| SCF/hr | 332,000 |

| -continued | |
|---|---:|
| Temperature, °F. | 500 |
| Lbs carbon black/1000 SCF | 5.55 |
| (24) Recycled Pellets to Pelleter (21): | |
| Lbs/hr (0.5% water) | 90 |
| (21) Black from Exchanger (16) Plus Recycled Pellets (24) from Dryer (28) | |
| Lbs/hr | 1,933 |
| Water, lbs/hr, (22) | 1,933 |
| (Containing 0.4 Wt. % calcium lignin sulfate) | |
| (23) Wet Pellets to Dryer (28) Including Black Produced, Black Recycled to Exchanger, and Black Recycled to Wet Pelleter): | |
| Lbs/hr (50% carbon black by weight) | 3,866 |
| (25) Dried Pellets to Screener (29) (Including Black Produced, Black Recycled to Heat Exchanger, and Off-Specification Pellets to Pelleter): | |
| Lbs/hr (0.5 wt. % water) | 1,943 |
| (26) Dried Carbon Black Pellets (NET): | |
| Lbs/hr (0.5 wt. % water) | 1,802 |

It can be appreciated from these data that addition of 0.15 lb cleaning carbon black/1000 SCF, based on unquenched reactor effluent, can reduce the temperature fluctuation of the output of the heat exchanger to about 30° F. when the cleaning carbon black is distributed to portions of the heat exchanger tubes according to the principle of the invention.

Although the invention has been described and illustrated by reference to a preferred embodiment thereof and its operation exemplified by a calculated example, the invention is not limited thereby but by the inventive concept as set forth in the claims appended hereto.

What is claimed is:

1. A method for removing at least a portion of the carbon black deposits on means defining a flow path of an indirect heat exchanger, the carbon black deposits having been laid down by passing a gas stream containing carbon black through the means defining a flow path of the indirect heat exchanger, said method comprising:

selectively introducing additional cleaning carbon black in an amount effective to remove at least a portion of the carbon black deposits into a first portion of the means defining a flow path and flowing said additional cleaning carbon black along with said gas stream through the means defining a flow path to remove at least a portion of the carbon black deposits therefrom; and selectively introducing additional cleaning carbon black in an amount effective to remove at least a portion of the carbon black deposits into at least one remaining portion of the means defining a flow path and flowing said additional cleaning carbon black along with said gas stream through the means defining a flow path to remove at least a portion of the carbon black deposits therefrom; wherein at least one of selectively introducing additional cleaning carbon black into said first portion and selectively introducing additional cleaning carbon black into said at least one remaining portion comprises introducing additional cleaning carbon black into said means defining a flow path separately from said gas stream containing carbon black.

2. A method as set forth in claim 1 wherein:
said additional cleaning carbon black is simultaneously selectively introduced into said first portion and said remaining portion.

3. A method as set forth in claim 1 wherein:

said additional cleaning carbon black is sequentially selectively introduced into said first portion and said remaining portion.

4. A method as set forth in claim 3 wherein:
additional cleaning carbon black is introduced into said first portion of said means defining a flow path for a first distribution interval;
additional cleaning carbon black is introduced into said at least one remaining portion of said means defining a flow path for a second distribution interval; and
an elapsed time interval occurs between selectively introducing said cleaning carbon black into said first portion and selectively introducing said additional cleaning carbon black into said remaining portion, the sum of said distribution intervals and said elapsed time interval comprising a single cleaning period.

5. A method as set forth in claim 4 wherein:
cleaning periods occur intervallically.

6. A method as set forth in claim 5 wherein:
said additional cleaning carbon black is introduced into said flow path during a distribution interval in a quantity sufficient to increase the amount of carbon black in the gas stream flowing through a respective portion of said flow path by an amount in the range of about 0.2 lbs/1000 SCF to about 35 lbs/1000 SCF.

7. A method as set forth in claim 5 wherein:
said additional cleaning carbon black is introduced into said flow path during a distribution interval in an amount effective to increase the amount of carbon black flowing through a respective portion of said flow path to an amount at least above about 6 pounds per 1000 SCF.

8. A method as set forth in claim 5 wherein:
said additional cleaning carbon black is introduced into said flow path during a distribution interval in an amount effective to increase the amount of carbon black flowing through a respective portion of said flow path to an amount in the range of about 6 pounds per 1000 SCF to about 35 pounds per 1000 SCF.

9. A method as set forth in claim 5 wherein:
said additional cleaning carbon black is introduced into said flow path during a distribution interval in an amount effective to increase the amount of carbon black flowing through a respective portion of said flow path to an amount in the range of about 7.5 pounds per 1000 SCF to about 35 pounds per 1000 SCF.

10. A method as set forth in claim 6 wherein:
said distribution interval is in the range of about ¼ to about 15 seconds.

11. A method as set forth in claim 6 wherein:
said distribution interval is in the range of about ½ to about 10 seconds.

12. A method as set forth in claim 6 wherein:
said distribution interval is in the range of about ½ to 3 seconds.

13. A method as set forth in claim 6 wherein:
said cleaning periods are caused to occur in the range of about 2 to about 60 times per hour.

14. A method as set forth in claim 6 wherein:
said cleaning periods are caused to occur in the range of about 4 to about 24 times per hour.

15. A method as set forth in claims 10 or 11 wherein:
said cleaning carbon black is introduced in the range of about 1 to about 10 percent of the amount per hour of carbon black in said stream flowing to the heat exchanger.

16. A method as set forth in claim 15 wherein:
said cleaning carbon black is introduced in an amount per hour in the range of about 2 to about 4 percent per hour of the carbon black in said stream flowing to said heat exchanger.

17. A method as set forth in claim 3 wherein:
said cleaning mixture is selectively sequentially distributed to at least 4 substantially equal portions of said means defining a flow path during a single cleaning period.

18. A method as set forth in claim 1 wherein:
said cleaning carbon black is a material selected from the group of pelleted carbon black, flocculent carbon black, partially agglomerated carbon black, and wet flocculent carbon black having a moisture content in the range of about 40 percent to about 60 percent by weight.

19. A method as set forth in claim 5 further comprising:
monitoring the output temperature of said heat exchanger to determine when said temperature exceeds a predetermined temperature; and
causing a single cleaning period to occur when said predetermined temperature is exceeded.

20. A method as set forth in claim 2 wherein:
said additional cleaning carbon black is continuously simultaneously selectively introduced into said first portion and said at least one remaining portion.

21. A method as set forth in claim 4 wherein:
cleaning periods occur cyclically at regular intervals.

22. A method as set forth in claim 4 wherein:
said cleaning periods occur in the range of 1 to 60 times per hour.

23. A method as set forth in claim 22 wherein:
said cleaning periods occur in the range of 4 to 24 times per hour.

* * * * *